United States Patent
Yenigalla et al.

(10) Patent No.: US 10,168,862 B2
(45) Date of Patent: Jan. 1, 2019

(54) SYSTEM AND METHOD FOR MENU-BASED NAVIGATION

(71) Applicant: Wal-Mart Stores, Inc., Bentonville, AR (US)

(72) Inventors: Sirisha Naga Lakshmi Yenigalla, Fremont, CA (US); Stefan Belavy, Oakland, CA (US); Wendy Coquilla, San Jose, CA (US); Christine Park, San Francisco, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 382 days.

(21) Appl. No.: 14/503,116

(22) Filed: Sep. 30, 2014

(65) Prior Publication Data
US 2016/0092042 A1    Mar. 31, 2016

(51) Int. Cl.
*G06F 3/0482* (2013.01)
*H04N 21/472* (2011.01)
*H04N 21/443* (2011.01)
*H04N 21/482* (2011.01)
*H04N 21/84* (2011.01)

(52) U.S. Cl.
CPC ....... *G06F 3/0482* (2013.01); *H04N 21/4438* (2013.01); *H04N 21/472* (2013.01); *H04N 21/482* (2013.01); *H04N 21/84* (2013.01)

(58) Field of Classification Search
None
See application file for complete search history.

(56) References Cited

U.S. PATENT DOCUMENTS

| 6,842,653 | B2 | 1/2005 | Weishut et al. | |
|---|---|---|---|---|
| 2011/0296351 | A1* | 12/2011 | Ewing, Jr. | G06F 3/0346 715/841 |
| 2012/0023455 | A1* | 1/2012 | Chen | G06F 17/30554 715/853 |
| 2013/0132857 | A1 | 5/2013 | Shapiro | |
| 2013/0159445 | A1 | 6/2013 | Zonka et al. | |

FOREIGN PATENT DOCUMENTS

WO     WO0065429     11/2000

\* cited by examiner

*Primary Examiner* — Jeffrey A Gaffin
*Assistant Examiner* — John M Heffington
(74) *Attorney, Agent, or Firm* — Bryan Cave Leighton Paisner LLP

(57) ABSTRACT

A system and method for menu-based navigation to view audio and/or visual media is disclosed. A user can navigate through a menu system by moving a cursor between various categories listed in a menu in a first display area. When the user selects a category, the menu changes to display sub-categories within the category, with the chosen category listed in a home position of the first display area. A second display area can display available selections within a selected category or sub-category. A third display area can display additional information about the selected media item. There also can be a display area where a user can create a filter within a selected category or sub-category. The menu selections can contain representations of categories. The categories can be genres or lists of movies or music. Other embodiments are also disclosed herein.

26 Claims, 11 Drawing Sheets

US 10,168,862 B2

SYSTEM AND METHOD FOR MENU-BASED NAVIGATION

TECHNICAL FIELD

This disclosure relates generally to menu-based navigation, and relates more particularly to menu-based navigation of a content-delivery system.

BACKGROUND

People often desire to view or listen to content at their home or place of business. Content may include media such as movies, television shows, and music. The proliferation of high-speed Internet connections has led to the increasing popularity of content-delivery over the Internet compared to using physical media (e.g., optical discs, hard drives, tapes, and the like). Content-delivery may involve satisfying a user's search request, but content delivery also can involve allowing a user to browse the choices of a content-delivery system. It can be desirable to have the browsing capabilities of a content-delivery system be as user-friendly as possible. It is also desirable to be able to use improved browsing capabilities on any type of content-delivery system.

BRIEF DESCRIPTION OF THE DRAWINGS

To facilitate further description of the embodiments, the following drawings are provided in which.

Figure 1:
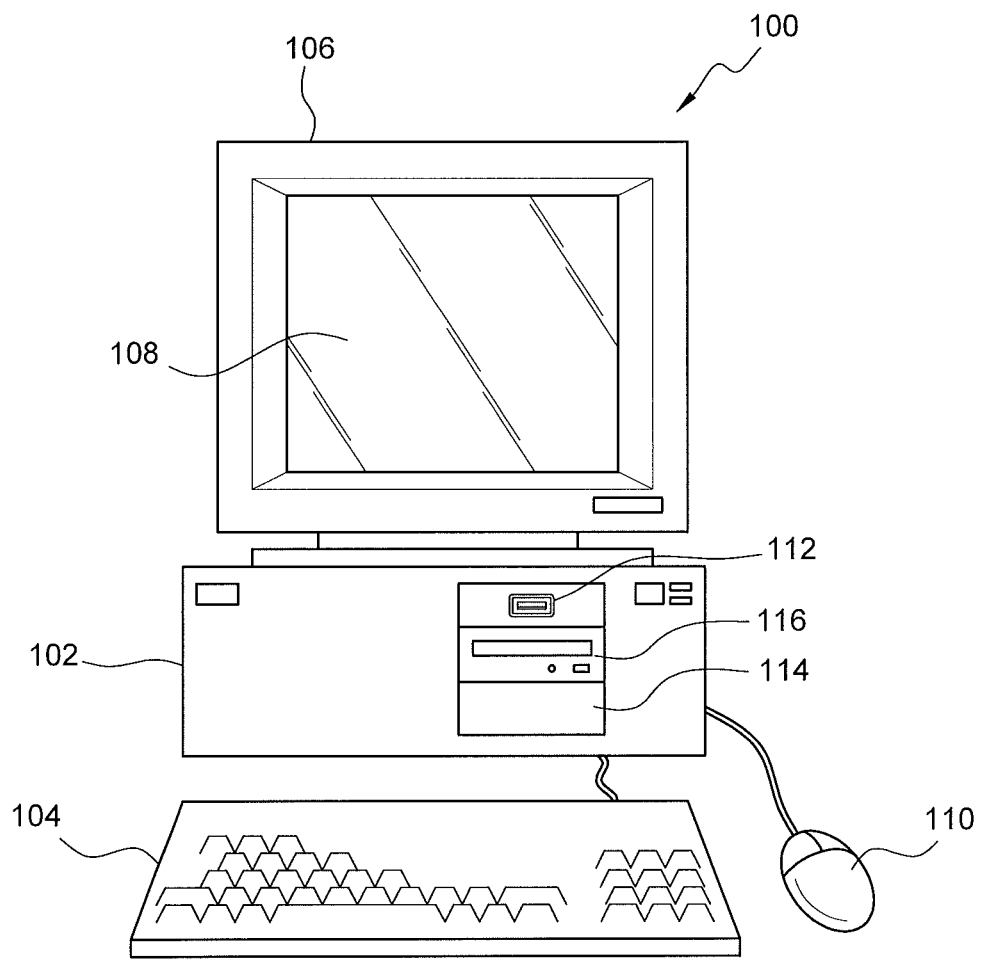
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: displaying, in a first display area of a screen, a list of available categories, the first display area comprising a home position and one or more secondary positions; displaying, in a second display area of the screen, a first list of available selections; receiving a first input selecting a first category from the list of available categories displayed in the first display area of the screen; moving the first category to the home position in the first display area of the screen; displaying the first category in the home position of the first display area of the screen; replacing the first list of available selections in the second display area of the screen with a second list of available selections based on the first category; and displaying, in the one or more secondary positions of the first display area, a list of available sub-categories based on the first category and while the first category is displayed in the home position of the first display area of the screen.

In one embodiment, a system may comprise: one or more processing modules; and one or more non-transitory storage modules storing computing instructions configured to run on the one or more processing modules and perform the acts of: displaying, in a first display area of a screen, a list of available categories, the first display area comprising a home position and one or more secondary positions; displaying, in a second display area of the screen, a first list of available selections; receiving a first input selecting a first category from the list of available categories displayed in the first display area of the screen; moving the first category to the home position in the first display area of the screen; displaying the first category in the home position of the first display area of the screen; replacing the first list of available selections in the second display area of the screen with a second list of available selections based on the first category; and displaying, in the one or more secondary positions of the first display area, a list of available sub-categories based on the first category and while the first category is displayed in the home position of the first display area of the screen.

In one embodiment, a method can comprise: displaying a first list of available showcases in a second display area of a screen; receiving a first input selecting a first one of the first list of available showcases; displaying a list of available categories in a first display area on the screen comprising a home position and one or more secondary positions, the list of available categories being based on the first input; and displaying a list of available media in the second display area on the screen based on the first one of the first list of available showcases.

In one embodiment, a system can comprise: one or more processing modules; and one or more non-transitory storage modules storing computing instructions configured to run on the one or more processing modules and perform the acts of: displaying a first list of available showcases in a second display area of a screen; receiving a first input selecting a first one of the first list of available showcases; displaying a list of available categories in a first display area on the screen comprising a home position and one or more secondary positions, the list of available categories being based on the first input; and displaying a list of available media in the second display area on the screen based on the first one of the first list of available showcases.

Today's technology provides many different ways for users to access content. Optical discs provide music, movies, and television ("TV") shows content to users in a high-quality, yet compact medium. High-speed Internet allows users to "stream" or otherwise download content over the Internet to their Internet-capable devices, without the need to use physical media. Exemplary content can include, but is not limited to, movies, music, TV shows, books, magazines, podcasts, radio shows, and the like. Internet-capable devices can include, but is not limited to, set-top boxes, gaming consoles, personal computers, tablets, smartphones, and the like. Some Internet-capable devices also provide the capability to read optical media, such as compact discs (CDs), Digital Versatile Discs (DVDs), and Blu-Ray through the use of an attached optical reader and/or writer. As of 2014, exemplary Internet capable devices can include tablets such as Apple's iPad, Microsoft's Surface, Samsung's Galaxy Tab, and Amazon's Kindle Fire, set top boxes or plug-in devices such as Roku, Google's Chromecast, and Apple TV, video game devices such as Sony's Playstation 3 and Playstation 4, Nintendo's Wii and Wii U, and Microsoft's Xbox 360 and Xbox One, personal computers (including both desktop and laptop devices), Blu-Ray and DVD drives, and smart TVs.

With such a device, a user can select content that he wishes to read, view, and/or hear. The user can read, view, and/or hear the content on or from a built-in display, or via an attached TV, monitor, and/or speakers.

In an embodiment used to view video content, when a user wants to watch a specific movie or TV show, it can be easy to do. The user enters in a search term, then selects the specific movie or episode they are interested in. But sometimes a user does not desire to watch a specific movie or TV show or listen to a specific piece of music, but merely wants to browse the available selections. One method used to browse available selections is to use categories or genres to browse. A genre selection can make it easier for a user to find a movie/TV show that she is interested in. A user can be interested in a comedy movie, so she would select the comedy genre from a menu. Then the user could select a sub-genre. For example, older comedy movies versus newer comedy movies. There can be more sub-genres available under each sub-genre. Thereafter, the user could be presented with a choice of movies/TV shows to watch. A similar scenario also can be present in embodiments used for the delivery of audio content.

In practice, navigation of such a system can be difficult. Some Internet-capable devices do not have a physical keyboard/mouse setup. Therefore, selecting between genres or sub-genres can require a lot of movement. For example, in an embodiment used for the delivery of audio content, a user can select the "Classical" genre. Then they can select "Baroque." But after seeing all the available choices, the user might decide that they wanted to hear "Romantic" era music instead. So the user would have to back out of the Baroque sub-genre, go back to the main menu, then select the Romantic sub-genre. From here, the user could be presented with further choices, such as Opera, Concertos, and Orchestral. Selecting any of those sub-genres can involve time consuming re-drawing of the screen and a discontinuous user experience as the user is constantly presented with changing screens and menu choices. It would be desirable to have a better user navigation experience for content-delivery systems.

Figure 2:
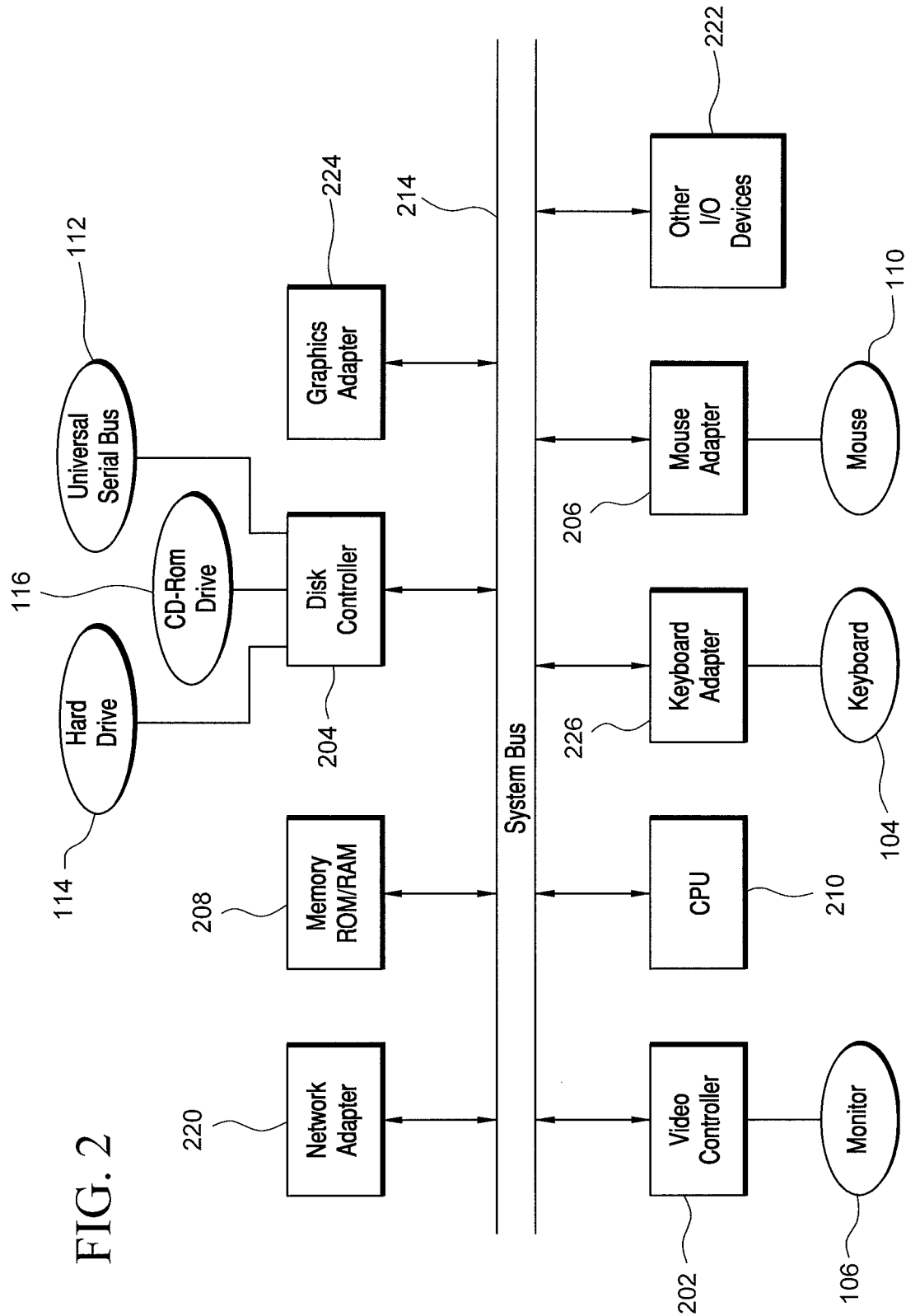
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-Ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-Ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1.2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 may or may not contain each of the items shown in FIG. 1 or 2 or may in fact contain multiple of each of the items shown in FIG. 1 or 2. For example, certain implementations of computer system 100 may not contain a CD-ROM, DVD, or Blu-Ray drive 116. Other implementations of computer system 100 may contain two CD-ROM, DVD, or Blu-Ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD).

Figure 3:
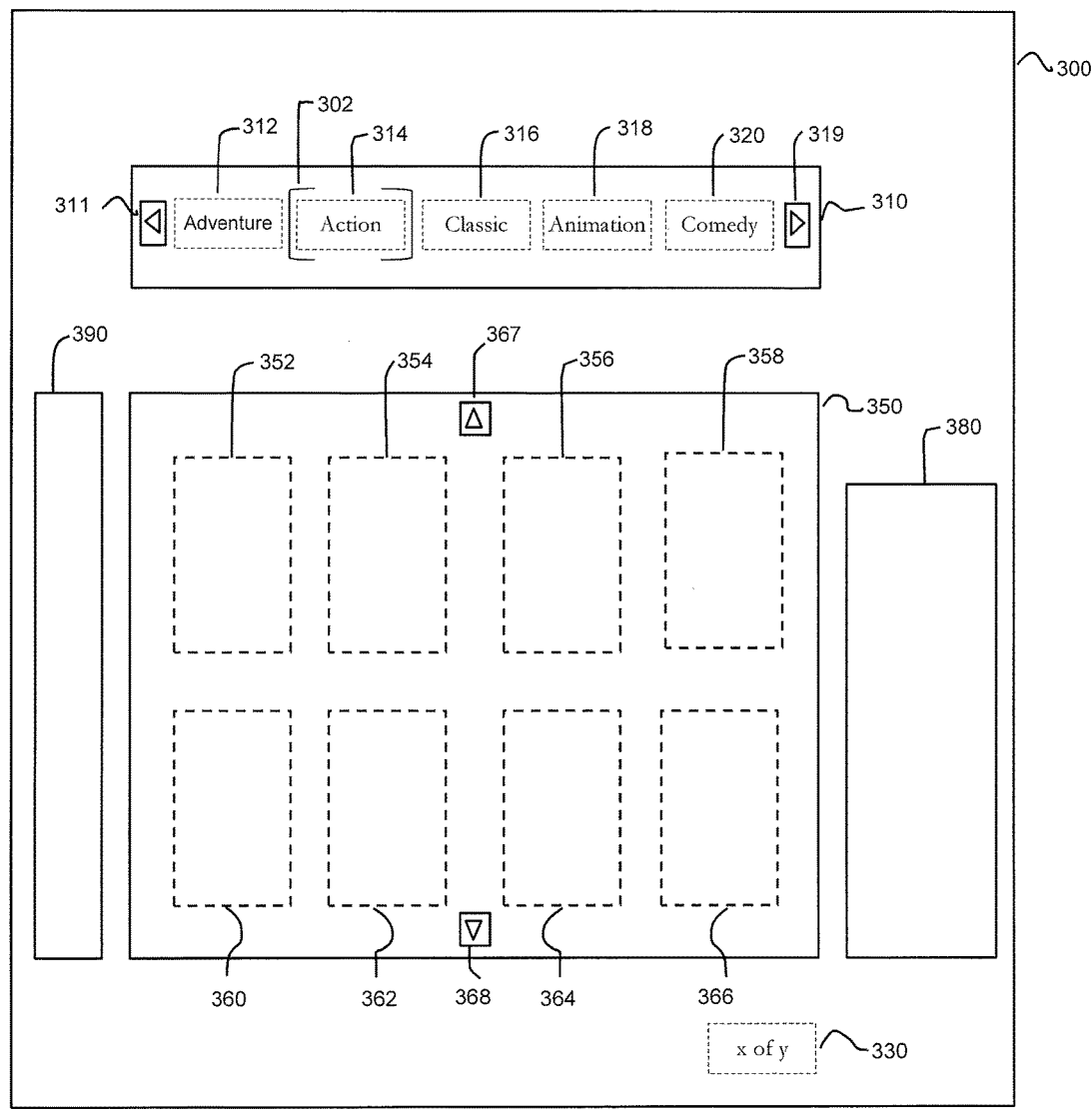
FIG. 3 illustrates an exemplary screen shot of an embodiment.

Turning ahead in the drawings, FIG. 3 is an example of a screen representation of a menu system of an embodiment. FIG. 3 is merely exemplary and embodiments of the screen representation and menu system are not limited to the embodiments presented herein. The screen representation and menu system can be employed in many different embodiments or examples not specifically depicted or described herein. In some embodiments, certain elements or modules of FIG. 3 can perform various procedures, processes, and/or activities. In other embodiments, the procedures, processes, and/or activities can be performed by other suitable elements or modules of FIG. 3.

The screen representation of FIG. 3 can be created by a system illustrated in FIGS. 1 and 2. Such a system can include, but is not limited to, a video game system, a set-top box, a personal computer (in either a desktop or a laptop form), an optical disc player, a smart TV, and the like. In some embodiments, the screen shown in FIG. 3 can be a web page shown in a browser. In some embodiments, the screen shown in FIG. 3 can be a page shown in an "app" of a tablet or smartphone. In some embodiments, the screen shown in FIG. 3 can be a page shown on a TV screen by a video game system, a set-top box, a personal computer (in either a desktop or a laptop form), an optical disc player, a smart TV, and the like.

Screen 300 comprises several display areas, including a first display area 310, a second display area 350, a third display area 380, a fourth display area 330, and a fifth display area 390.

First display area 310 can comprises a menu featuring a list of available categories 312, 314, 316, 318, and 320. In some embodiments, first display area 310 can be referred to as a ribbon area or a ribbon panel. In one embodiment, a home position can be the left-most position of first display area 310, e.g., the position used by available category 312 in FIG. 3. The remaining positions can be called secondary positions. In some embodiments, the list of available categories is scrollable. For example, although five categories are listed on a screen at any one time, there can be additional number of categories accessible through the use of navigation devices. There can be a navigation device at one or both sides of first display area 310 to allow a user to scroll through other available categories. Exemplary navigation devices can be arrow 311 and arrow 319. By accessing arrow 311 and 319, additional categories can be viewed. It should be understood that other types of navigation devices can be used, including, but not limited to, horizontal scroll bars, vertical scroll bars, and other visual indicia of the availability of additional content.

Also shown in FIG. 3 is a cursor 302. Cursor 302 can take one of a variety of different forms. As illustrated in FIG. 3, cursor 302 can take the form of a bracket that fits around one of categories 312, 314, 316, 318, and 320. It should be understood that cursor 302 is not so limited in form. Cursor 302 can be of a different color or different shade from a background color. Cursor 302 also can use a combination of tactics for visibility, such as the use of both brackets and coloring/shading. There can be other configurations of cursor 302, as long as a user is able to distinguish a category merely being displayed and a category being selected. In some embodiments, cursor 302 also can be moved from first display area 310 to other areas of the screen, such as second display area 350, third display area 380, fourth display area 330, and/or fifth display area 390.

Available categories 312, 314, 316, 318, and 320 can take a variety of different formats. For example, in an embodiment being used to view video content, each of available categories 312, 314, 316, 318, and 320 can be an available genre that is available to be viewed. Exemplary genres include labels such as adventure, animation, classic cinema, action, comedy, crime & thriller, documentary, drama, fantasy, musical, mystery, science fiction, and the like.

Within second display area 350 is a list of available content. In an embodiment, before a category in display area 310 is selected, second display area 350 can be configured to display a certain content as a default view, while displaying, in the first display area, the list of available categories. For example, in an embodiment used to display video content, the default view in the second display area can be popular movies. In another embodiment, the default view can be new movies. In another embodiment, the default view can be based on prior usage. For example, in some embodiments, a user of a system using an embodiment can have an account with a video content provider. Thus, the user can have a history associated with the system, where the history can comprise movies and or TV episodes that the user has viewed, rented, or purchased in the past. Thereafter, the default view can be configured such that "recommended" movies are shown in the second display area. The recommended movies can be based on the user's prior viewing history. Thus, a user who likes foreign movies might have a different default view than a user who watches a lot of science fiction movies.

In an embodiment, second display area 350 can be configured such that it only displays available content that is restricted by a category being selected by cursor 302. For example, in an embodiment used to display video content, if the cursor is on an "Action" genre in first display area 310, selections 352, 354, 356, 358, 360, 362, 364, and 366 can represent video content within the action genre, such as movies from the Transformers, James Bond, Batman, Expendables, the X-Men series, and the like.

Second display area 350 is configured such that, when one of selections 352, 354, 356, 358, 360, 362, 364, and 366 is selected by a user, the user is able to view and/or listen to the content. In an embodiment used for video content, as described above, each of selections 352, 354, 356, 358, 360, 362, 364, and 366 can represent a movie or TV episode. When the user moves cursor 302 over his chosen selection within second display area 350 and indicates his desire to view the movie through a particular action (such as pressing a particular switch on a remote control, video game controller, or touchscreen interface), an appropriate media file is then transmitted to the user: The appropriate media file is then played. An embodiment can facilitate the playing of the media file in one of a variety of different manners. In some embodiments, the media file is transmitted to a remote location. The remote location can be the device with which the user is accessing the embodiment. In some embodiments, the transmission can be a downloaded, such that the entire media file is transmitted before it is played. In some embodiments, the transmission can be streamed, such that playback of the media file can begin before the entire media file is transmitted to the user's media playback device. The transmission and playback of audio media files can be accomplished in a similar manner.

In an embodiment being used to select audio content, each of available categories 312, 314, 316, 318, and 320 can be an available musical genre that is available to be chosen. Exemplary genres can include labels such as classical, pop, jazz, rock, hip-hop, blues, electronic music, and the like. In such an embodiment, within second display area 350 is a list of available audio content that can be restricted by category. For example, if cursor 302 is on a "Classical" genre, selections 352, 354, 356, 358, 360, 362, 364, and 366 can be audio content within the Classical genre. For example, symphonies by Beethoven, concertos by Mozart, and operas by Wagner can make up selections 352, 354, 356, 358, 360, 362, 364, and 366. When cursor 302 is moved to a "Jazz" genre, the selections in second display area 350 can be changed to jazz artists, such as Miles Davis, John Coltrane, Spyro Gyra, and the like. In some embodiments, the changing of the second display area can occur whenever cursor 302 is moved to a different category or genre. In other embodiments, the changing of the second display area can occur after a user selects a category or genre.

In addition to genres, categories 312, 314, 316, 318, and 320, can take other forms. In one embodiment, each of categories 312, 314, 316, 318, and 320 can represent of list. The list can be any type of list. For example, the list could be the top 20 movies or music pieces for a particular week. The list could be movies that have been nominated for a particular award. The list could be musical pieces that have been nominated for a particular award. The list could be a compilation. For example, a list of movies that won a Best Picture Oscar or a list of movies listed in a particular organization's "Best of the Year" list. The list could be songs that reached number 1 on a chart any time in the 1990s. The list could be new releases for a particular month. The list could be by studio. For example, there could be a list for Disney animated movies, Pixar animated movies, Nickelodeon TV shows, CBS TV shows, and the like. The list could be by actor, such as a list featuring Robert De Niro movies or a list featuring Marlon Brando movies. The list could be by TV series, such as a list of Doctor Who episodes or Simpsons episodes. The list could be memorable sports moments, such as game-winning Super Bowl drives. The types of lists that could be generated for categories 312, 314, 316, 318, and 320 are not limited to those listed herein.

In some embodiments, while second display area 350 is shown in FIG. 3 as containing eight possible choices, there can be more or less than eight possible choices within the chosen category or sub-category or filter (described in more detail below). Therefore, it can be desirable for second display area 350 to be scrollable to allow a user to scroll through available selections in order to find the movie/TV show to view or audio selection to listen to. In some embodiments, second display area 350 contains a first navigation device 367 and a second navigation device 368. Navigation devices 367 and 368 can be configured to allow a user to scroll through available choices. For example, navigation devices 367 and 368 can be configured to appear as arrows to the user. In other embodiments, there is only one navigation device 367 present and it can be in the form of a scroll bar (vertical or horizontal). Other embodiments are also possible. In some embodiments, either navigation device 367 or 368 can be grayed-out or otherwise not accessible to a user in certain situations. For example, if there are no further selections (e.g., the user is at the top of the list of available selections or the bottom of the list of available selections or there are fewer available selections than there are spaces on the screen), the display can be configured such that the cursor cannot get to one or both of navigation device 367 or 368.

A user is able to navigate through the interface by moving cursor 302. In an embodiment, a user has access to a device that enables the movement of cursor 302. For example, a user can have a video game controller, such as a controller of the type used to control an Xbox 360, Xbox One, Playstation 3, Playstation 4 or Wii U. A user can have a remote control such as the type commonly used to control televisions and audio/video devices. These remote controls can control a device using infrared signals or can control a device using radio frequency (RF) signals. In an embodiment using a video game controller or in an embodiment using a remote control, a user can use arrow keys on the controller to change the on-screen location of cursor 302. Then the user can depress a select switch to make a particular selection.

When a user makes a selection, a variety of actions can occur. For example, the cursor might be within second display area 350 on one of selections 352, 354, 356, 358, 360, 362, 364, and 366 when the selection is made. In an embodiment being used to view video content, each of selections 352, 354, 356, 358, 360, 362, 364, and 366 could represent a movie or an episode of a television show. Thus, selecting one of 352, 354, 356, 358, 360, 362, 364, and 366 starts the chosen movie/episode. In an embodiment being used to select audio content, each of selections 352, 354, 356, 358, 360, 362, 364, and 366 could represent a song or album or "station" of the selected category.

If the cursor is within first display area 310 on one of categories 312, 314, 316, 318, or 320, the user can select the chosen category. Doing so can cause several things to happen. In one embodiment, the chosen category can move to the home position. For example, in one embodiment (as shown in FIG. 3), category 312 can be "Adventure", category 314 can be "Action", category 316 can be "Classic Cinema", category 318 can be "Animation", and category 320 can be "Comedy." If the user selects the category labeled "Action," the graphic for "Action" can be moved to the home position (the left-most position of first display area 310). Thereafter, the remaining categories can be replaced with sub-categories within the "Action" category. The list of available sub-categories is different from the first list of categories. There can be a variety of manners of displaying sub-categories for each category. For example, the sub-categories can represent the decade the movies were released in. So there could be a 1930s sub-category, a 1940s sub-category, a 1950s sub-category, and the like. In another example, the sub-categories can be for a movie series. So, within the "Action" category, there could be a "James Bond" sub-category, a "Transformers" sub-category, an "X-Men" sub-category, and the like. In another example, the sub-category can be an age range. So there could be an ages 5 and under category, an ages 6-9 category, an ages 10.13 category, and the like. In another embodiment, the sub-categories can be sub-genres within the chosen category. For example, within the "Action" category there can be types of action movies, such as "Blockbuster", "Apocalypse", "Chases", "Comedy", "Espionage", "Heists", and the like. Within each sub-category, there could be more sub-categories. For example, within the "Action" category and the "Comedy" sub-category, there could be additional sub-categories within the Action/Comedy sub-category. In some embodiments, the home position shows the chosen category while displaying, in the one or more secondary positions of the first display area, other categories from the list of categories.

It should be understood that, in an embodiment, it is possible for content to be available under more than one category/sub-category combination. For example, as described above with respect to an embodiment used to display video content, there can be a "Comedy" sub-category within an "Action" category. There also can be an "Action" sub-category within a "Comedy" category. In another example, there can be year based sub-categories within a Category. So a movie can be listed under a "1990s" sub-category under both "Action" and "Comedy. Or a movie can be listed under both "Children's" and "Animation." Or there can be studio-based categories. So a movie can be in a "Children's" category, an "Animation" category, and a "Pixar" category. The same can be true for an embodiment used to play audio content. A particular work (such as Beethoven's Fifth Piano Concerto) can be located in a "Beethoven" category, located in a "Classical" category, located in a "Piano" category, and located in a "Concerto" category.

Figure 5:
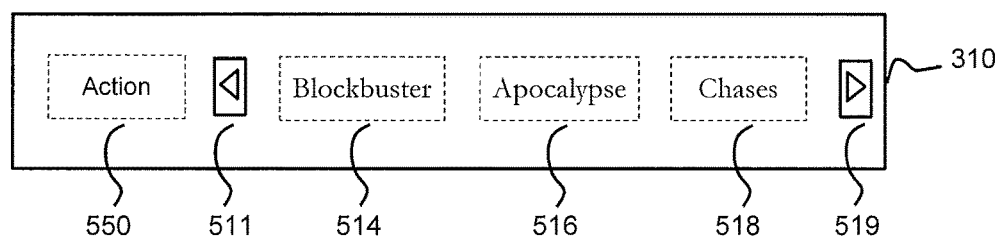
FIG. 5 illustrates an exemplary screen shot of a portion of the screenshot of FIG. 3.

With reference to FIG. 5, an illustration featuring first display area 310 is presented. In FIG. 3, first display area 310 is shown with broad categories. The cursor 302 is on category 314, "Action." FIG. 5 illustrates the result of first display area 310 after the "Action" category has been selected by a user. As described above, there can be a series of changes that occur when a category is selected by a user.

First display area 310 has changed to indicate to the user that a category has been selected. The selected category ("Action" in this example), has been moved to the home position 550. The placement of the navigation devices has been changed to indicate that the available categories are within the category in the home position. In FIG. 5, navigation devices comprise arrow 511 and 519, but they can be replaced by any suitable navigation device that can be used to indicate the presence of additional choices to a user. The categories have been replaced by sub-categories such as sub-categories 514 ("Blockbuster"), 516 ("Apocalypse"), and 518 ("Chases"). While only three sub-categories are shown in FIG. 5, it should be understood that any number of sub-categories can be shown in first display area 310.

In some embodiments, the sub-categories being displayed can be fixed. For example, in an embodiment used for audio content, selecting a "rock" category can always show the same sub-categories, e.g., "progressive rock," "punk rock," "soft rock," and the like. In other embodiments the sub-categories being displayed can be dynamically chosen based on various criteria. For example, a user's previous history can show that he likes "progressive rock," but almost never listens to "soft rock." Therefore, the next time this user selects the "rock" category, the "soft rock" category can be replaced with another category, but other sub-categories related to "progressive rock" can be displayed, such as "progressive metal" or "symphonic rock." In other embodiments, a user can be able to select or de-select certain categories to force them to be displayed or to prevent them from being displayed.

Returning to FIG. 3, in addition to the changes of first display area 310, before the user selected the Action category, second display area 350 can have been configured to show a default selection of movies, including movies in many different genres. After the user selected the Action category, the available selections in second display area 350 have been changed to show movies within the Action category.

The categories listed in first display area 310 can be a horizontal row of one or more buttons stating the categories such as Action, Animation, or Comedy. In some embodiments, the horizontal row of one or more buttons can be scrollable. In some embodiments, the buttons can be in the form of text labels. In one embodiment, the text labels are over a representation chosen to illustrate the category. The representation can be an illustration, a photo, an image, a thumbnail, etc. For example, Action could be illustrated by a picture of a Transformer. Animation could be a picture of Shrek. Comedy could be a picture from a Ben Stiller movie. Adventure could be a picture of Indiana Jones. Classic Cinema could be an image from Citizen Kane.

The selections within second display area 350 can be text labels for selections 352, 354, 356, 358, 360, 362, 364, and 366, stating the title of the movie, TV episode, or musical piece being selected. In one embodiment, the text labels can be replaced or augmented with a representation from the movie, TV, episode, or musical piece being selected. The representation can be an illustration, a photo, an image, a thumbnail, a recreation of a poster, and the like. For example, a movie poster representing the movie Toy Story 3 can be used in place of selection 352; and a movie poster representing the movie Brave can be used in place of selection 354.

There also can be a third display area 380. In one embodiment, third display area 380 can contain information about a currently highlighted selection. For example, in an embodiment used to display video content, if the user's cursor 302 is on a particular movie (one of selections 352, 354, 356, 358, 360, 362, 364, and 366), third display area 380 can display production information about the movie. Production information can include, but is not limited to, the year the movie was released, the actors in the movie, the director of the movie, the Motion Pictures Association of America ("MPAA") rating, a user rating indicating user reviews of the movie (such as an Internet Movie Database ("IMDb") rating), and a synopsis of the movie. Production information also can include information about how to access the movie. For example, in a subscription-based model, there can be different tiers of subscriptions. Thus, there can be information about whether or not the selected movie is within the user's subscription tier. In an embodiment where movies are purchased or rented, production information can include information about how to purchase or rent the particular movie. In such an embodiment, if a user had previously purchased the movie, the production information can reflect such a purchase and allow the user to view the movie again. Production information also can include information about format. For example, some movies could be available in a standard-definition version, a low-bandwidth high-definition version, a high-bandwidth high-definition version, a 3-D version, and an ultra-high definition (also known as "4K") version. The production information could be configured to show the user the available formats and the cost for each format. In some embodiments, the ability to play movies or TV episodes can be contained in third display area 380. Thus, the ability to rent a movie, purchase a movie, or play a movie can be in third display area 380.

When the user moves the cursor 302 to a new movie (e.g., a different one of selections 352, 354, 356, 358, 360, 362, 364, and 366), third display area 380 can be updated to show information about the newly selected movie. In such a manner, the user is able to view information about a movie, TV episode, or musical piece without obscuring other available choices within second display area 350.

In an embodiment used for audio content, production information can include information about a chosen musical piece. Such production information can include, but is not limited to, the year of release, a list musicians who performed on the piece, and other information about the musical piece. Such production information also can include information about how to purchase, rent, or otherwise access the chosen musical piece.

There also can be a fourth display area 330. In some embodiments, fourth display area 330 can be used to inform the user how many records match a selected criteria. For example, in an embodiment used for video content, fourth display area 330 might read "25,000 records," informing the user that there are 25,000 movies/TV episodes available for viewing. When the user selects a category corresponding to a genre by moving the cursor within the first display area 310, fourth display area 330 can be updated such that it shows the number of movies/TV episodes within that category. When a user further selects a sub-category, fourth display area 330 can update again to show an even smaller number of movies within the selected sub-category.

Figure 4:
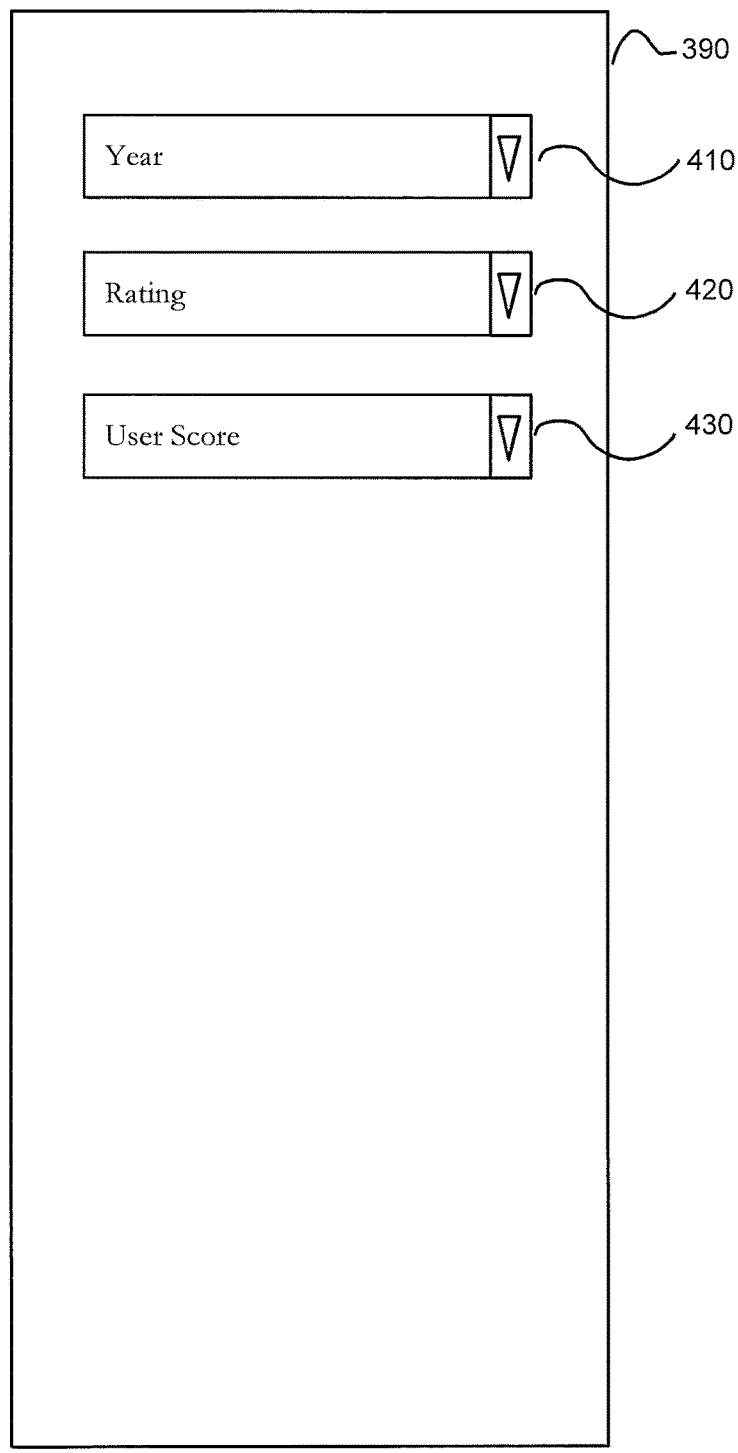
FIG. 4 illustrates an exemplary screen shot of a portion of the screenshot of FIG. 3.

There also can be a fifth display area 390. In some embodiments, fifth display area 390 can be used to allow the user to filter the available selections. With reference to FIG. 4, details of fifth display area 390 are shown in greater detail. Fifth display area 390 can comprise a series of drop-down boxes 410, 420, and 430. It should be understood that a greater number of drop-down boxes can be displayed. However, only three are shown in FIG. 4 for illustrative purposes. Drop-down box 410 is shown in FIG. 4 as allowing a user to select a year. For example, in an embodiment used to display video content, the user can select to view movies/TV episodes only after 1990 or only before 2010. In some embodiments, there can be more than one drop-down box for a year input to allow a user to select both a start year and an end year. Through these inputs, a user is able create a filter criteria and send the filter criteria to an embodiment.

When a user selects a year in drop-down box 410, the remainder of display 300 changes in reaction. For example, in an embodiment used for video content, fourth display area 330 can change to display the number of movies/TV episodes that meet the selected criteria. In one embodiment, second display area 350 changes according to the selected filter. For example, all movies/TV episodes that do not meet the selected criteria in drop-down box 410 is removed and replaced with movies/TV episodes that do meet the selected criteria.

Exemplary drop-down boxes 420 and 430 are also illustrated. Drop-down box 420 can contain a rating, such as a Motion Picture Association of America (MPAA) rating (e.g., G, PG, PG-13, and R). Thus, a user can create a filter such that only movies with the selected rating are shown in second display area 350. Drop-down box 430 can contain a user rating, such as that from the Internet Movie Database (IMDb). In such a manner, a user can create a filter such that only movies with a user score above a certain number are shown in second display area 350. It should be understood that, as each filter is made, fourth display area 330 also can change such that the number of movies/TV episodes that meet the filter criteria is shown.

It should be understood that multiple filters can be used simultaneously. For example, a user can select only movies from before 2010 with a "PG-13" rating, that has an IMDb score of at least 7.0.

It should be understood that year, rating, and user scores boxes shown in FIG. 4 are merely exemplary filters. Embodiments are not limited to filters in those categories. Other filters can be used in addition to those shown in FIG. 4. Other filters also can replace the filters shown in FIG. 4. Exemplary filters can include a filter by actor, by director, by studio.

In some embodiments, fifth display area 390 can present additional options to a user. For example, fifth display area 390 can provide a sort selector to give a user the ability to sort the available selections available in second display area 350. In an embodiment used to deliver video content, the user can sort the available selection in a variety of different manners, such as by year of release, by title, by user rating, by MPAA rating, and the like. The user also can have the ability to sort in an increasing manner (e.g., oldest selection first) or in decreasing manner (e.g., newest selection first). In some embodiments, a user is able to select a default sorting method such that selections are always sorted in a certain manner. In some embodiments, in the absence of a chosen sort order or user-selected default sort order, there can be a standard sort order. The standard sort order can choose which available selections are shown on a variety of criteria. Exemplary criteria can include popularity, date of release, or the presence of special promotions. For an example of special promotions, when one movie becomes newly available, previous movies in the series can become promoted such that the user is able to easily find all the movies in a series.

In some embodiments, fifth display area 390 is not always available. For example, if the chosen category or sub-category has a small number of selections, it may not be advantageous to allow a user to create a filter of the selections. In some embodiments, the number of selections that is used to determine if a fifth display area 390 is available is if there are more than 40 selections available. If there are 40 or fewer selections, the user should be able to scroll through the selections (using navigation devices 367 and 368, for example) without having to first limit the number of selections through the use of a filter. It should be understood that other embodiments can use a different number than 40 selections to determine when to show fifth display area 390.

Returning to FIG. 3, in some embodiments, one or more of first display area 310, second display area 350, third display area 380, fourth display area 330, and fifth display area 390 can be hidden from view when not in use. For example, third display area 380 can be configured such that it is only visible when a cursor is on one of selections 352, 354, 356, 358, 360, 362, 364, or 366. Therefore, when the cursor is in first display area 310 (selecting a category) or the cursor is in fifth display (creating a filter), third display area 380 can be hidden from view. In some embodiments, when third display area 380 is hidden from view, second display area 350 expands to occupy the space where display area 380 was located. In some embodiments, fifth display area 390 can be a small area that merely indicates the ability to create a filter. In such an embodiment, when a user selects fifth display area 390, fifth display area 390 can be configured to expand to allow a user to create a filter. In such an embodiment, one or more of the remaining display areas can be configured to shrink and/or move in response to the expanding of fifth display area 390.

It should be understood that, while each of first display area 310, second display area 350, third display area 380, fourth display area 330, and fifth display area 390 are displayed with borders, such a border might not be present in some embodiments. There can be other methods to differentiate between different areas of the screen. In some embodiments, different areas have different amounts of shading, such that first area 310, for example, has a lighter background than the rest of the screen. Colors also can be used to differentiate between different screen areas. In some embodiments, there might not be any differentiation between different screen areas.

It should be understood that the locations of first display area 310, second display area 350, third display area 380, fourth display area 330, and fifth display area 390 are merely exemplary. Other embodiments can have a different layout of the various screen elements. For example, in some embodiments, first display area 310 is located below second display area 350. In some embodiments fourth display area 330 is located within second display area 350. In some embodiments, fifth display area 390 can be to the right of second display area 350. Other layouts also can be used.

Filters in fifth display area 390 are also not limited to drop-down boxes. Any method of limiting the number of available selections can be used. For example, there can be an area for a user to enter a search criteria such that a user can type in, for example, the name of an actor, and the filter will work to include only movies in which the actor had a starring role.

Figure 6:
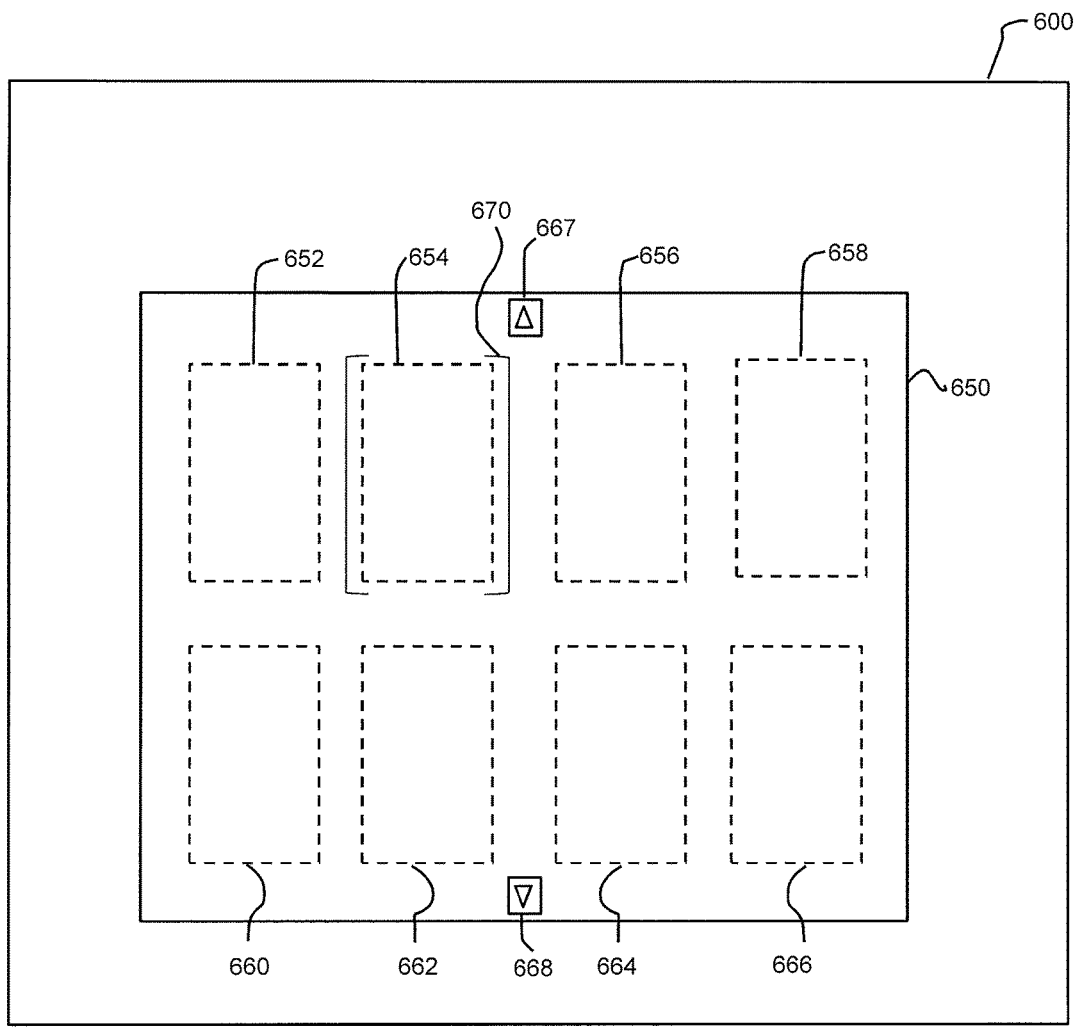
FIG. 6 illustrates an exemplary screen shot of an embodiment.

In some embodiments, a first display area might not be available to a user until the user has made a selection. With reference to FIG. 6, a screen representation of such an embodiment is presented. FIG. 6 is merely exemplary and embodiments of the screen representation are not limited to the embodiments presented herein. The screen representation can be employed in many different embodiments or examples not specifically depicted or described herein. In some embodiments, certain elements or modules can perform various procedures, processes, and/or activities. In other embodiments, the procedures and/or activities can be performed by other suitable elements or modules of FIG. 6.

FIG. 6 illustrates a screen 600 comprising a second display area 650, without a first display area. Within second display area 650 are showcases 652, 654, 656, 658, 660, 662, 664, and 666. In some embodiments, second display area 650 can be the only display area on screen 600 until after a user selects a showcase.

A showcase can be a predetermined or dynamically created collection of related media. Exemplary showcases can be created to take advantage of various timings. For example, there can be a separate showcase for an upcoming holiday. Thus, there could be a Halloween-themed showcase available in October, a Thanksgiving-themed showcase available in November, and a Christmas-themed showcase available in December. Each of these showcases can feature various media related to the showcase theme. A Halloween-themed showcase could feature scary movies or scary music. A Christmas-themed showcase could feature Christmas movies. When baseball playoffs start, there could be a baseball-themed showcase featuring baseball movies and/or music. When football playoffs start, there could be a football-themed showcase. When the time for airing Academy Awards nears, there could be one or more Academy Award-themed showcases.

There also can be showcases that are based around studios. For example, there could be a Disney showcase featuring Disney animated movies. There could be a Dreamworks animation showcase. There could be a Nickelodeon showcase featuring many of the shows available on the Nickelodeon network. It should be understood that each showcase can have several sub-categories underneath. For example, after selecting the Nickelodeon showcase, a user could be presented with a different list of available showcases, each for various Nickelodeon shows, such as SpongeBob SquarePants, The Fairly OddParents, and The Penguins of Madagascar. Within each of those showcases, there could be additional showcases. For example, by selecting SpongeBob SquarePants, a user could be presented with yet another listing of additional showcases, each presenting a different season of the show.

A dynamically created showcase can feature media that is related to media that a user has previously shown interest in. For example, a user who has watched a lot of science documentaries can be shown showcases featuring other science documentaries. A user who watches a lot of musicals can be shown showcases featuring musicals.

In a manner similar to that described above with respect to FIG. 3, in an embodiment, there is a cursor 670 visible to a user. Via a remote control, video game controller, touch screen, keyboard/mouse, and the like, a user is able to move cursor 670 among the various showcases 652, 654, 656, 658, 660, 662, 664, and 666. In some embodiments, there can be one or more navigation devices such as navigation devices 667 and 668 to allow a user to scroll through a scrollable list of showcases. By activating navigation devices 667 and/or 668, a user can access additional showcases that were not previously visible.

When a user is interested in a showcase, the user can indicate his interest by placing the cursor on or over the desired showcase and activating a switch, such as a select button on a remote control. Doing so can have a variety of different effects. In some embodiments, another display area becomes visible.

Figure 7:
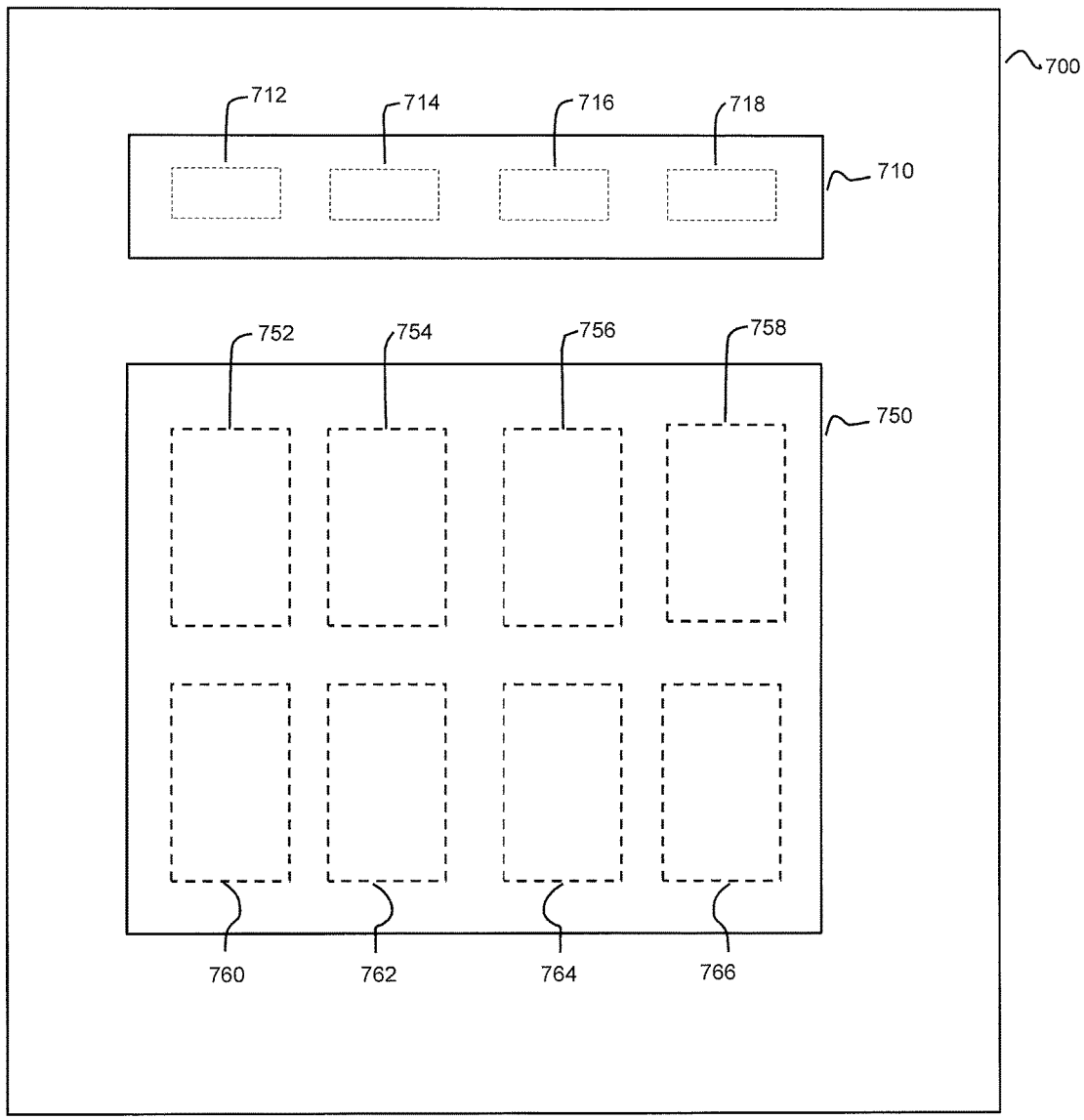
FIG. 7 illustrates an exemplary screen shot of an embodiment.

With reference to FIG. 7, a screen representation 700 is presented after a user selects a showcase. FIG. 7 is merely exemplary and embodiments of the screen representation and menu system are not limited to the embodiments presented herein. The screen representation and menu system can be employed in many different embodiments or examples not specifically depicted or described herein. In some embodiments, certain elements or modules of FIG. 7 can perform various procedures, processes, and/or activities. In other embodiments, the procedures, processes, and/or activities can be performed by other suitable elements or modules of FIG. 7.

Similar to FIG. 6, there is a second display area 750 in FIG. 7. More specifically, FIG. 7 illustrates a second display area 750, which can contain selections 752, 754, 756, 758, 760, 760, 762, 764, and 766. In addition to second display area 750 is a first display area 710. First display area 710 can include categories 712, 714, 716, and 718. Similar to categories 312, 314, 316, 318, and 320 described above with reference to FIG. 3, categories 712, 714, 716, and 718 in FIG. 7 can take a variety of different forms, such as arrangements or genres. Also similar to category 312 in FIG. 3, category 712 in FIG. 7 can be located at a home position. First display area 710 in FIG. 7 also can have other features similar to first display area 310 in FIG. 3 such as navigation devices, etc.

Selections 752, 754, 756, 758, 760, 760, 762, 764, and 766 in FIG. 7 can be available media to play (such as movies, TV episodes, or musical pieces). They also can be additional showcases, as described above. Selections 752, 754, 756, 758, 760, 760, 762, 764, and 766 in FIG. 7 can be similar to selections 352, 354, 356, 358, 360, 360, 362, 364, and 366 in FIG. 7, and second display area 750 in FIG. 7 can have other features similar to second display area 350 in FIG. 3

Although a third display area, a fourth display area, and a fifth display area (similar to those shown in FIG. 3) are not shown in FIG. 7, it should be understood that one or more such display areas can be present in certain embodiments.

Figure 8:
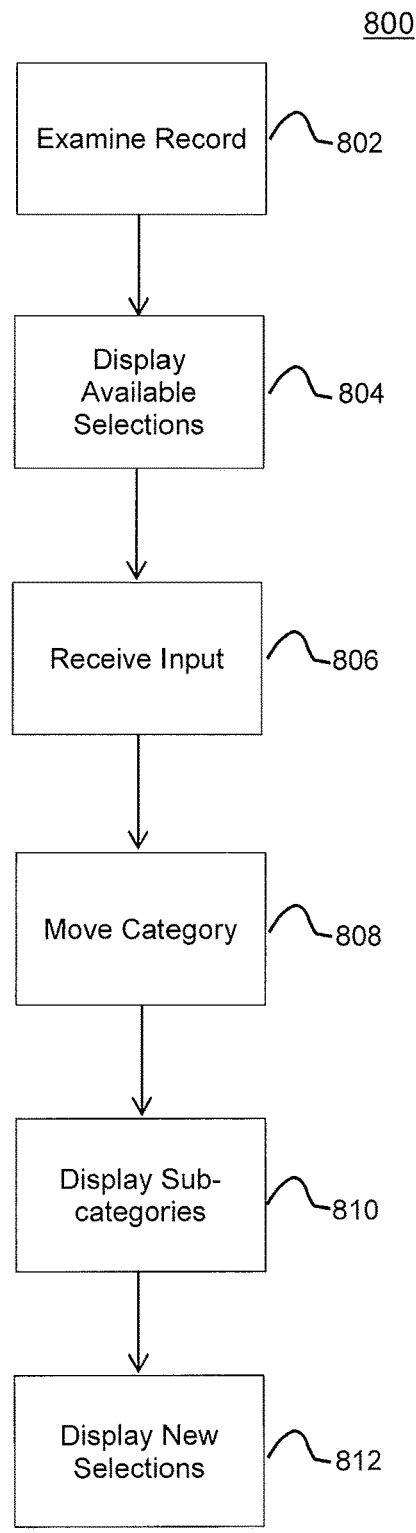
FIG. 8 illustrates a flow chart of a method to navigate a menu according to an embodiment.

Turning ahead in the figures, FIG. 8, a flow chart illustrating a method 800 to navigate a menu according to an embodiment is presented. Method 800 is merely exemplary and is not limited to the embodiments presented herein. Method 800 can be employed in many different embodiments or examples not specifically depicted or described herein. In some embodiments, the procedures, the processes and/or the activities of method 800 can be performed in the order presented. In other embodiments, the procedures, the processes, and/or the activities of method 800 can be performed in any other suitable order. In still other embodiments, one or more of the procedures, the processes, and/or the activities of method 800 can be combined or skipped. In some embodiments, method 800 can be implemented by computer system 100 (FIG. 1).

The available categories can be displayed on a screen (block 802). This listing can follow the format presented in FIG. 3, with a scrollable list of categories being presented in a first display area. Returning to FIG. 8, the available selections are displayed on a screen (block 804). This displaying can follow the format presented in FIG. 3, with a list of available selections being presented in a second display area. Returning to FIG. 8, input can be received (block 806). This can occur in a variety of different manners. For example, a user can indicate a selection by pressing a switch on a remote control or video game controller. When the user selects a category, the category is moved to a home position (block 808). The sub-categories corresponding to the category are displayed (block 810). Again, these listings can follow a format such as that set forth in FIG. 3 or other FIGS. For example, the sub-categories can be listed in the first display area next to the home position. Returning to FIG. 8, new selections are then displayed (block 812). In an embodiment using the screen set forth in FIG. 3, the selections can be displayed in the second display area of the screen.

The sequence of the blocks in FIG. 8 can be re-arranged. For example, blocks 802 and 804 can be reversed or performed simultaneously with each other. As another example, blocks 810 and 812 can be reversed or performed simultaneously with each other. Other variations are also possible.

Figure 9:
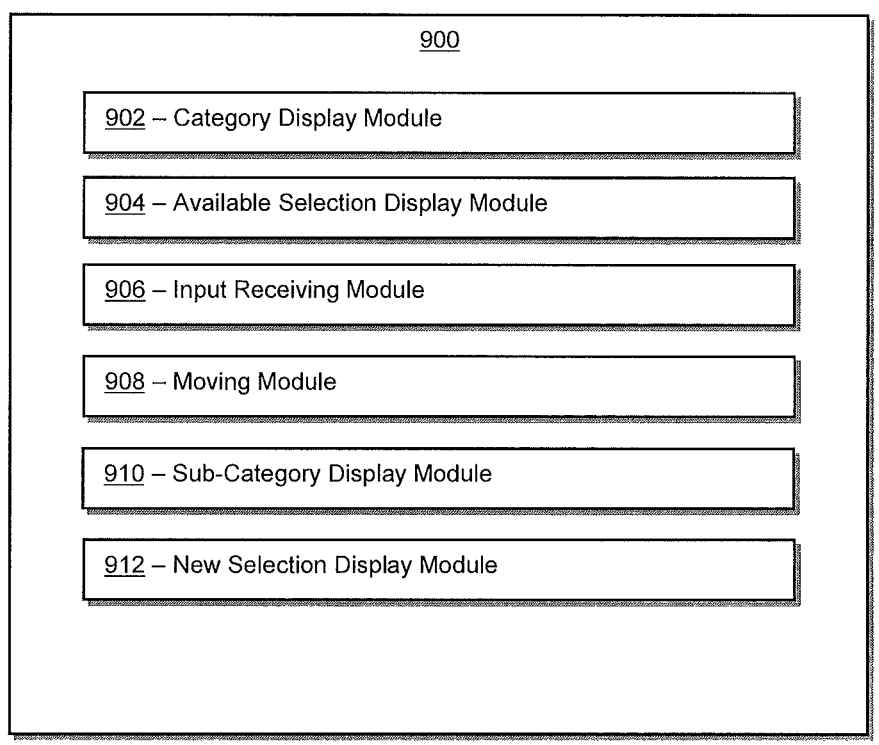
FIG. 9 illustrates a block diagram of a system for navigating a menu according an embodiment.

Turning ahead in the figures, FIG. 9 illustrates a block diagram of a system 900 for navigating a menu according an embodiment. System 900 is merely exemplary and is not limited to the embodiments presented herein. System 900 can be employed in many different embodiments or examples not specifically depicted or described herein. In some embodiments, certain elements or modules of database system 900 can perform various procedures, processes, and/or acts. In other embodiments, the procedures, processes, and/or acts can be performed by other suitable elements or modules.

In a number of embodiments, system 900 can include a category display module 902. In certain embodiments, display module 902 can perform block 802 (FIG. 8) of displaying available categories.

In a number of embodiments, system 900 can include an available selection display module 904. In certain embodiments, display module 904 can perform block 804 (FIG. 8) of displaying available selections.

In a number of embodiments, system 900 can include an input receiving module 906. In certain embodiments, input receiving module 906 can perform block 806 (FIG. 8) of receiving an input.

In a number of embodiments, system 900 can include a moving module 908. In certain embodiments, moving module 908 can perform block 808 (FIG. 8) of moving a chosen category to a certain place on a screen.

In a number of embodiments, system 900 can include a sub-category display module 910. In certain embodiments, display module 910 can perform block 810 (FIG. 8) of displaying available sub-categories.

In a number of embodiments, system 900 can include a new selection display module 912. In certain embodiments, display module 912 can perform block 812 (FIG. 8) of displaying a new list of selections.

Figure 10:
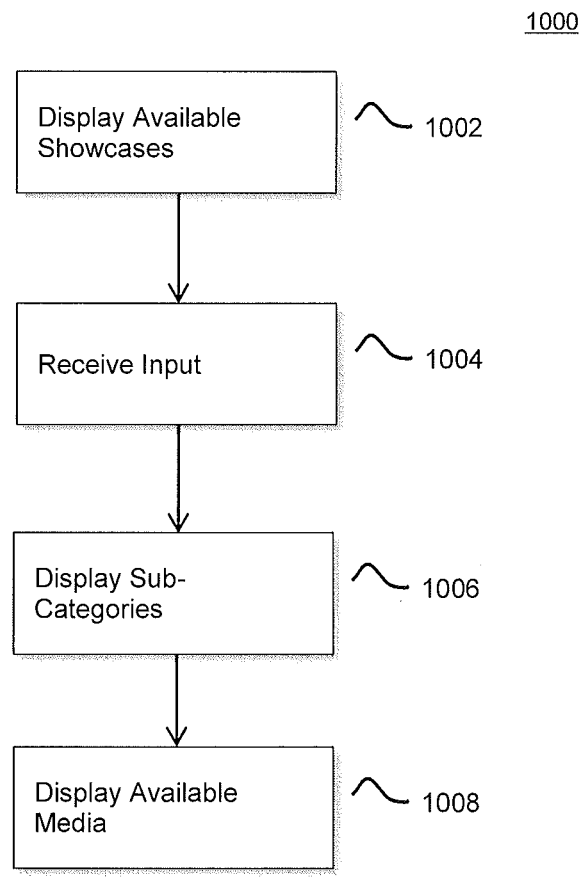
FIG. 10 illustrates a flow chart of a method to navigate a menu using showcases according to an embodiment.

Turning ahead in the figures, FIG. 10, a flow chart illustrating a method 1000 to navigate a menu according to an embodiment is presented. Method 1000 is merely exemplary and is not limited to the embodiments presented herein. Method 1000 can be employed in many different embodiments or examples not specifically depicted or described herein. In some embodiments, the procedures, the processes and/or the activities of method 1000 can be performed in the order presented. In other embodiments, the procedures, the processes, and/or the activities of method 1000 can be performed in any other suitable order. In still other embodiments, one or more of the procedures, the processes, and/or the activities of method 1000 can be combined or skipped. In some embodiments, method 1000 can be implemented by computer system 100 (FIG. 1).

The available showcases can be displayed on a screen (block 1002). This listing can follow the format presented in FIG. 6, with a scrollable list of showcase being presented in a second display area. When performing block 1002, the portion of the screen typically showing the first display area can be blank. Returning to FIG. 10, user input is received (block 1004). This can occur in a variety of different manners. For example, a user can indicate a selection by pressing a switch on a remote control or video game controller. The received input can indicate a selected showcase. Returning to FIG. 10, sub-categories are displayed (block 1006). This displaying can follow the format presented in FIG. 7, with a list of available sub-categories being presented in a first display area. Returning to FIG. 10, available media is displayed (block 1008). This displaying can follow the format presented in FIG. 7, with a list of available media being presented in a second display area. Thereafter, the steps presented with respect to FIG. 8 can be performed.

The sequence of the blocks in FIG. 10 can be re-arranged. For example, blocks 1006 and 1008 can be reversed or performed simultaneously with each other. Other variations are also possible.

Figure 11:
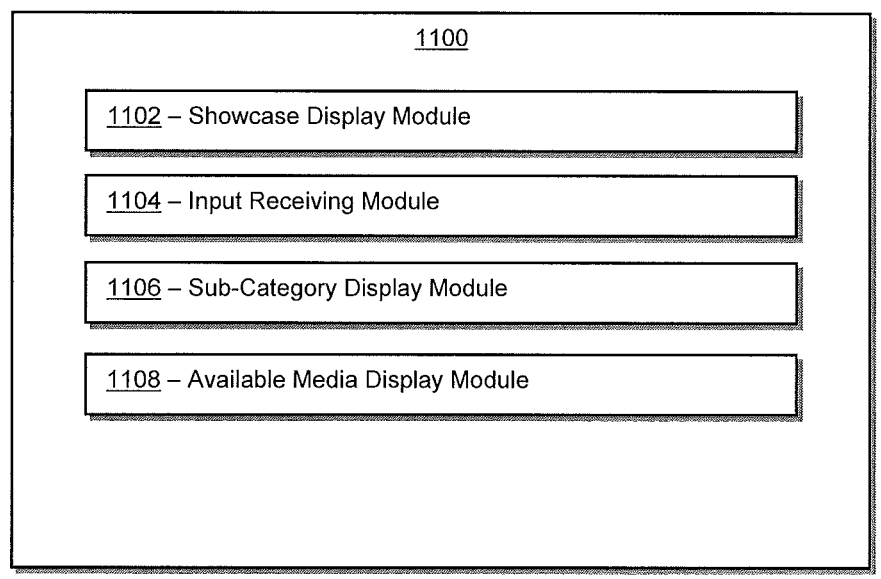
FIG. 11 illustrates a block diagram of a system for navigating a menu using showcases according an embodiment.

Turning ahead in the figures, FIG. 11 illustrates a block diagram of a system 1100 for navigating a menu according an embodiment. System 1100 is merely exemplary and is not limited to the embodiments presented herein. System 1100 can be employed in many different embodiments or examples not specifically depicted or described herein. In some embodiments, certain elements or modules of database system 1100 can perform various procedures, processes, and/or acts. In other embodiments, the procedures, processes, and/or acts can be performed by other suitable elements or modules.

In a number of embodiments, system 1100 can include a showcase display module 1102. In certain embodiments, showcase display module 1102 can perform block 1002 (FIG. 10) of displaying available showcases categories.

In a number of embodiments, system 1100 can include an input receiving module 1104. In certain embodiments, input receiving module 1104 can perform block 1004 (FIG. 10) of receiving user input.

In a number of embodiments, system 1100 can include sub-category display module 1106. In certain embodiments, sub-category display module 1106 can perform block 1006 (FIG. 10) of displaying sub-categories.

In a number of embodiments, system 1100 can include an available media display module 1108. In certain embodiments, available media display module 1108 can perform block 1008 (FIG. 10) of displaying available media.

Via a ribbon panel, users can navigate across movie/TV genre panels. From there, the user can select sub-genre panels, to filter and find their desired content quickly and easily. The navigation filters from genre to sub-genre to content choices in a seamless manner, allowing the user to remain on a specific screen and allow the user to navigate without the need for excessive movement.

The motion language can consist of clicking on a genre panel, and having the selected genre panel move to the left, while the other genre panels fade away. Related sub-genre panels then fade-up, available for selection, based on the user's choice. These sub-genre panels filter down to a narrow sub-set of results, in line with the user's selections. The visual language includes an iconic image, treated in a desaturated image style that is relevant to the genre or sub-genre category.

Although the above embodiments have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 can be modified, and that the foregoing discussion of certain of these embodiments does not necessarily represent a complete description of all possible embodiments. For example, one or more of the procedures, processes, or activities of FIGS. 1-11 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    transmitting instructions to display, in a second display area of a screen of a user, a default view of a first list of available media selections comprising at least one of popular media selections, new media selections, or recommended media selections based on a user history of the user while a first display area of the screen is devoid of a list of available media categories, a home position, and one or more secondary positions;
    receiving a first input from the user;
    in response to receiving the first input:
        automatically causing the screen to exit out of the second display area; and
        automatically transmitting instructions to display, in the first display area of the screen, the list of available media categories, wherein the first display area comprises the home position and the one or more secondary positions;
    receiving a second input from the user selecting a first media category from the list of available media categories displayed in the first display area of the screen; and
    in response to receiving the second input:
        automatically transmitting instructions to display the first media category in the home position of the first display area of the screen;
        automatically transmitting instructions to display, in the second display area of the screen, a second list of available media selections based on the first media category; and
        automatically transmitting instructions to display, in the one or more secondary positions of the first display area, a list of available media sub-categories of the first media category in place of a portion of the list of available media categories that were not selected.

2. The method of claim 1 further comprising:
    receiving a third input selecting a first media sub-category from the list of available media sub-categories, wherein media sub-categories of the list of available media sub-categories are dynamically generated based on a previous history of one or more media sub-category selections of the user; and
    transmitting instructions to display, in the second display area, a third list of available media selections based on the first media sub-category.

3. The method of claim 1, wherein:
    automatically transmitting the instructions to display the list of available media categories comprises:
        automatically transmitting instructions to display, in the first display area, a scrollable row of one or more buttons, each button of the one or more buttons representing a media category of the list of available media categories, the list of available media categories comprising the scrollable row of the one or more buttons; and
    the first display area further comprises one or more navigation devices configured to allow the user to scroll through the scrollable row of the one or more buttons.

4. The method of claim 3, wherein:
    each button of the one or more buttons comprises a representation of a category of the list of available media categories.

5. The method of claim 1, wherein:
    transmitting the instructions to display the default view of the first list of available media selections comprises displaying a scrollable row of thumbnails, each thumbnail of the scrollable row of thumbnails representing an available media selection of the first list of available media selections;
    the first list of available media selections comprises the scrollable row of thumbnails; and
    the second display area further comprises one or more navigation devices configured to allow the user to scroll through the first list of available media selections.

6. The method of claim 1 further comprising:
    transmitting instructions to display, in a third display area of the screen, data related to an available media selection of one of (1) the first list of available media selections or (2) the second list of available media selections without obscuring other available media selections of the one of (1) the first list of available media selections or (2) the second list of available media selections;
    wherein:
        the data comprise information related to the available media selection upon which a cursor is located within the second display area.

7. The method of claim 6, wherein:
    transmitting the instructions to display the data further comprises:
        transmitting instructions to display production information about the available media selection, the production information comprising at least one of a year the available media selection was released, a rating of the available media selection, or a synopsis of the available media selection; and
    the data comprise the production information.

8. The method of claim 7, wherein:
    the third display area further comprises access information about the available media selection, the access information comprising at least one of (1) whether or not the available media selection is within a subscription tier of the user, (2) how to purchase or rent the available media selection, or (3) a cost for each format of a plurality of formats of the available media selection; and the method further comprises:
receiving a third input indicating a desire to access the available media selection;
transmitting, to a remote location, a media file according to the third input; and
facilitating a playing of the media file.

9. The method of claim 1 further comprising:
transmitting instructions to display, in a fourth display area of the screen and without obscuring the first display area and the second display area, a number of media selections, wherein the number of media selections represents a total number of available media selections that meet a selected criteria.

10. The method of claim 1 further comprising:
transmitting instructions to display a fifth display area of the screen without obscuring the first display area and the second display area, wherein the fifth display area is configured to allow a creation of a media selection filter, the media selection filter configured to allow the user to create filter criteria for the first list of available media selections or the second list of available media selections using one or more of:
release years of the first list of available media selections or the second list of available media selections;
ratings of the first list of available media selections or the second list of available media selections;
actors of the first list of available media selections or the second list of available media selections;
directors of the first list of available media selections or the second list of available media selections; or
studios of the first list of available media selections or the second list of available media selections;
receiving the filter criteria; and
transmitting instructions to display, in the second display area, only media selections of the first list of available media selections or the second list of available media selections that meet the filter criteria.

11. The method of claim 10, wherein:
transmitting the instructions to display the fifth display area further comprises:
transmitting instructions to display a sort selector configured to allow a change in an order of the first list of available media selections or the second list of available media selections in the second display area by at least one of:
popularity of the first list of available media selections or the second list of available media selections;
release dates of the first list of available media selections or the second list of available media selections; or
special promotions of the first list of available media selections or the second list of available media selections.

12. A system comprising:
a. one or more processors; and
b. one or more non-transitory storage devices storing computing instructions configured to run on the one or more processors and perform acts of:
transmitting instructions to display, in a second display area of a screen of a user, a default view of a first list of available media selections comprising at least one of popular media selection, new media selections, or recommended media selections based on a user history of the user while a first display area of the screen is devoid of a list of available media categories, a home position, and one or more secondary positions;
receiving, a first input from the user;
in response to receiving the first input:
automatically causing the screen to exit out of the second display area; and
automatically transmitting instructions to display, in the first display area of the screen, the list of available media categories, wherein the first display area comprises the home position and the one or more secondary positions;
receiving a second input from the user selecting a first media category from the list of available media categories displayed in the first display area of the screen; and
in response to receiving the second input:
automatically transmitting instructions to display the first media category in the home position of the first display area of the screen;
automatically transmitting instructions to display, in the second display area of the screen, a second list of available media selections based on the first media category; and
automatically transmitting instructions to display, in the one or more secondary positions of the first display area, a list of available media subcategories of the first media category in place of a portion of the list of available media categories that were not selected.

13. The system of claim 12, wherein:
the computing instructions are further configured to perform acts of:
receiving a third input selecting a first media sub-category of the list of available media sub-categories from the list of available media sub-categories, wherein media sub-categories are dynamically generated based on a previous history of one or more media sub-category selections of the user; and
transmitting instructions to display, in the second display area, a third list of available media selections based on the first media sub-category.

14. The system of claim 13 wherein:
automatically transmitting the instructions to display the list of available media categories comprises:
automatically transmitting instructions to display, in the first display area, a scrollable row of one or more buttons, each button of the one or more buttons representing a media category of the list of available media categories, the list of available media categories comprising the scrollable row of the one or more buttons; and
the first display area further comprises one or more navigation devices configured to allow the user to scroll through the scrollable row of the one or more buttons.

15. The system of claim 14, wherein:
each button of the one or more buttons comprises a representation of a media category of the list of available media categories.

16. The system of claim 13, wherein:
transmitting the instructions to display the default view of the first list of available media selections comprises displaying a scrollable row of thumbnails, each thumbnail of the scrollable row of thumbnails representing an available media selection of the first list of available media selections;

the first list of available media selections comprises the scrollable row of thumbnails; and the second display area further comprises one or more navigation devices configured to allow the user to scroll through the first list of available media selections.

17. The system of claim 12, wherein:

the computing instructions are further configured to perform an act of:

transmitting instructions to display, in a third display area of the screen, data related to an available media selection of one of (1) the first list of available media selections or (2) the second list of available media selections without obscuring other available media selections of the one of (1) the first list of available media selections or (2) the second list of available media selections;

wherein:

the data comprise information related to the available media selection upon which a cursor is located within the second display area.

18. The system of claim 17, wherein:

transmitting the instructions to display the data further comprises:

transmitting instructions to display production information about the available media selection, the production information comprising at least one of a year the available media selection was released, a rating of the available media selection, or a synopsis of the available media selection; and the data comprise the production information.

19. The system of claim 18, wherein:

the third display area further comprises access information about the available media selection, the access information comprising at least one of (1) whether or not the available media selection is within a subscription tier of the user, (2) how to purchase or rent the available media selection, or (3) a cost for each format of a plurality of formats of the available media selection; and the computing instructions are further configured to perform acts of:

receiving a third input indicating a desire to access the available media selection;

transmitting, to a remote location, a media file according to the third input; and facilitating a playing of the media file.

20. The system of claim 12, wherein:

the computing instructions are further configured to perform an act of:

transmitting instructions to display a number of media selections in a fourth display area of the screen without obscuring the first display area and the second display area, wherein the number of media selections represents a total number of available media selections that meet a selected criteria.

21. The system of claim 12, wherein:

the computing instructions are further configured to perform acts of:

transmitting instructions to display a fifth display area of the screen without obscuring the first display area and the second display area, wherein the fifth display area is configured to allow a creation of a media selection filter, the media selection filter configured to allow the user to create filter criteria for the first list of available media selections or the second list of available media selections using one or more of:

release years of the first list of available media selections or the second list of available media selections;

ratings of the first list of available media selections or the second list of available media selections;

actors of the first list of available media selections or the second list of available media selections;

directors of the first list of available media selections or the second list of available media selections; or studios of the first list of available media selections or the second list of available media selections;

receiving the filter criteria; and transmitting instructions to display, in the second display area, only media selections of the first list of available media selections or the second list of available media selections that meet the filter criteria.

22. The system of claim 21, wherein:

transmitting the instructions to display the fifth display area further comprises:

transmitting instructions to display a sort selector configured to allow a change in an order of the first list of available media selections or the second list of available media selections in the second display area by at least one of:

popularity of the first list of available media selections or the second list of available media selections;

release dates of the first list of available media selections or the second list of available media selections; or special promotions of the first list of available media selections or the second list of available media selections.

23. The method of claim 1, wherein the first display area and the second display area are distinct from each other and do not overlap each other.

24. The method of claim 1, wherein automatically causing the screen to exit out of the second display area causes the second display area to be devoid of the first list of available media selections.

25. The system of claim 12, wherein the first display area and the second display are distinct from each other and do not overlap.

26. The system of claim 12, wherein automatically causing the screen to exit out of the second display area causes the second display area to be devoid of the first list of available media selections.

* * * * *